United States Patent
Wang et al.

(10) Patent No.: US 12,339,419 B2
(45) Date of Patent: Jun. 24, 2025

(54) ANTI-BLUE LIGHT RESIN LENS WITH REFRACTIVE INDEX OF 1.50 AND PREPARATION METHOD THEREOF

(71) Applicants: Jiangsu Conant Optical Co., Ltd., Nantong (CN); Shanghai Conant Optical Co., Ltd., Shanghai (CN)

(72) Inventors: Chuanbao Wang, Nantong (CN); Qingbo Yan, Nantong (CN); Linxing Chu, Nantong (CN); Yang Li, Nantong (CN); Weidong Du, Nantong (CN)

(73) Assignees: Jiangsu Conant Optical Co., Ltd., Nantong (CN); Shanghai Conant Optical Co., Ltd., Shanghai (CN)

( * ) Notice: Subject to any disclaimer, the term of this patent is extended or adjusted under 35 U.S.C. 154(b) by 463 days.

(21) Appl. No.: 18/062,369

(22) Filed: Dec. 6, 2022

(65) Prior Publication Data
US 2023/0341589 A1    Oct. 26, 2023

(30) Foreign Application Priority Data
Apr. 22, 2022    (CN) .......................... 202210427974.2

(51) Int. Cl.
*G02B 1/04*    (2006.01)
*G02C 7/10*    (2006.01)
(52) U.S. Cl.
CPC ............. *G02B 1/041* (2013.01); *G02C 7/104* (2013.01)

(58) Field of Classification Search
CPC .......... G02B 1/041; G02B 1/04; G02C 7/104; G02C 7/108; G02C 7/022; G02C 7/10; C08F 222/1006; C08F 2/44; C08F 4/04; C08F 220/14; C08F 220/1803; C08F 222/103; C08F 222/104; C08K 5/3475; C08K 5/3492
See application file for complete search history.

(56) References Cited

U.S. PATENT DOCUMENTS 11,204,445 B2 * 12/2021 Fromentin ............... G02B 1/04
2025/0093561 A1 * 3/2025 Dubertret ................ C08F 18/24

* cited by examiner

*Primary Examiner* — Tuyen Tra
(74) *Attorney, Agent, or Firm* — CBM PATENT CONSULTING, LLC

(57) ABSTRACT

An anti-blue light resin lens with a refractive index of 1.50, including the following components: 100 parts by weight of resin monomer, 0.1-10 parts by weight of anti-blue light powder, 0.1-1 part by weight of initiator, 0.1-1 part by weight of antioxidant and 0.1-1 part by weight of light stabilizer; the resin monomer is a mixture of a monofunctional acrylate and a polyfunctional acrylate, and a mass ratio of the monofunctional acrylate to the polyfunctional acrylate in the mixture is (10-50):(50-90); with the raw materials according to the specific ratio, the anti-blue light resin lens with a refractive index of 1.50 provided in the disclosure has a higher blue light absorptivity, a low yellowness index, a high visible light transmittance and good impact resistance.

18 Claims, No Drawings

ANTI-BLUE LIGHT RESIN LENS WITH REFRACTIVE INDEX OF 1.50 AND PREPARATION METHOD THEREOF

CROSS REFERENCES

This application claims priority to Chinese Patent Application Ser. No. CN202210427974.2 filed on 22 Apr. 2022.

TECHNICAL FIELD

The disclosure belongs to the field of resin lenses, and particularly relates to an anti-blue light resin lens with a refractive index of 1.50 and a preparation method thereof, more particularly to a low-yellowness-index high-visible-light-transmittance anti-blue light resin lens with a refractive index of 1.50.

BACKGROUND

Among visible light, blue light is a kind of high-energy short-wave light with great energy. Blue light can easily penetrate the crystalline lens of the eye and reach the retina, causing photochemical damage to the eye. This may speed up the oxidation process of the *Macula lutea* area of the eye and cause great damage to the eye, leading to symptoms such as dry eyes and sore eyes, and even fundus lesions after cataract surgery. Blue light may inhibit the secretion of melatonin, disturb sleep and increase the incidence of serious diseases. With the progress of society and the development of science and technology, people's living standards are getting higher and higher. In order to solve the above problems at the same time, many people choose to wear spectacles with anti-blue light lenses.

CR-39, which started to be used as an ophthalmic corrective lens since 1955-1960, is the first generation of ultralight and impact-resistant resin lens. As a thermosetting material, CR-39 monomer in a liquid state may be polymerized and cured by heating and addition of a catalyst. CR-39 is very suitable as an optical lens due to its properties: a refractive index of 1.5 (close to that of an ordinary glass lens), a specific gravity of 1.32 (almost half of that of glass), an Abbe number of 58-59 (only very low dispersion), impact resistance and high light transmittance. However, due to steric effects, the initiator used for the CR-39 monomer has always been diisopropylperoxydicarbonate (IPP) which has a strong oxidizing effect. In the preparation of the anti-blue light resin lens, this initiator may oxidize anti-blue light powder, making the lens have a very high yellowness index and a lower visible light transmittance. Moreover, the anti-blue light powder that can be used in CR-39 at present is benzophenone. Due to the problem of environmental pollution in the production process of benzophenone, the annual production of benzophenone anti-blue light powder is decreasing and the price is increasing, which leads to the increasingly higher cost of the lens. In addition, the peroxide initiator may oxidize the anti-blue light powder, which makes the CR-39 anti-blue light lens have a heavy base color and difficult to popularize in the market.

SUMMARY

In view of the defects above, an object of the disclosure is to provide an anti-blue light resin lens with a refractive index of 1.50, which has a higher blue light absorptivity, a low yellowness index and a high visible light transmittance.

In order to achieve the above objective, the disclosure is implemented through the following technical solutions.

Provided is an anti-blue light resin lens with a refractive index of 1.50, including the following components: 100 parts by weight of resin monomer, 0.1-10 parts by weight of anti-blue light powder, 0.1-1 part by weight of initiator, 0.1-1 part by weight of antioxidant and 0.1-1 part by weight of light stabilizer. The resin monomer is a mixture of a monofunctional acrylate and a polyfunctional acrylate, and a mass ratio of the monofunctional acrylate to the polyfunctional acrylate in the mixture is (10-50):(50-90).

Preferably, the lens includes the following components: 100 parts by weight of resin monomer, 0.5-5 parts by weight of anti-blue light powder, 0.2-0.8 part by weight of initiator, 0.2-0.5 part by weight of antioxidant and 0.2-0.5 part by weight of light stabilizer. The resin monomer is the mixture of the monofunctional acrylate and the polyfunctional acrylate, and the mass ratio of the monofunctional acrylate to the polyfunctional acrylate in the mixture is (20-40):(60-80).

Preferably, the lens has a refractive index ne of 1.505±0.003, an Abbe number of 55±5%, a yellowness index of lower than 12 and a visible light transmittance of higher than 90%

Preferably, the monofunctional acrylate is one or more of methyl methacrylate, ethyl methacrylate, propyl methacrylate, methyl laurate, isodecyl acrylate and isooctyl acrylate.

Preferably, the polyfunctional acrylate is two or more of polyethylene glycol dimethacrylate, dipropylene glycol diacrylate, 1,6-hexanediol diacrylate, trimethylolpropane trimethacrylate, glycerol trimethacrylate, pentaerythritol tetraacrylate, di(trimethylolpropane) tetraacrylate and dipentaerythritoltetraacrylate.

Preferably, the anti-blue light powder is one or two of benzotriazole and triazine; the benzotriazole is one of 2-(5-tert-butyl-2-hydroxyphenyl)benzotriazole, 2-(2'-hydroxy-5'-tert-octylphenyl)benzotriazole, 2'-(2'-hydroxy-3'-tert-butyl-5'-methylphenyl)-5-chlorobenzotriazole, 2-[2-hydroxy-3,5-di(1,1-dimethylpropylphenyl)]-2H-benzotriazole, 2-(2''-hydroxy-3'',5''-di-tert-butylphenyl)-5-chlorobenzotriazole, 2-(3,5-di-tert-butyl-2-hydroxyphenyl)-2H-benzotriazole or 2-(2'-hydroxy-3'-isobutyl-5'-tert-butylphenyl)benzotriazole. The triazine is 2-[4-[2-hydroxy-3-tridecyloxypropyl]oxy]-2-hydroxyphenyl]-4,6-bis(2,4-dimethylphenyl)-1,3,5-triazine, 2-[4-[2-hydroxy-3-dodecyloxypropyl]oxy]-2-hydroxyphenyl]-4,6-bis(2,4-dimethylphenyl)-1,3,5-triazine or 2-[2-hydroxy-4-[3-(2-ethylhexyloxy)-2-hydroxypropoxy]phenyl]-4,6-bis(2,4-dimethylphenyl)-1,3,5-triazine.

Preferably, the initiator is an azo initiator, preferably azobisisobutyronitrile or azobisisoheptonitrile.

Preferably, the antioxidant is one or more of pentaerythritol tetrakis[β-(3,5-di-tert-butyl-4-hydroxyphenyl)propionate], n-octadecyl β-(3,5-di-tert-butyl-4-hydroxyphenyl) propionate, isooctyl β-(3,5-di-tert-butyl-4-hydroxyphenyl) propionate and 1,3,5-tris(3,5-di-tert-butyl-4-hydroxybenzyl) isocyanuric acid. The light stabilizer is one or more of bis(2,2,6,6-tetramethyl-4-piperidinyl) sebacate and poly{[(6-1,1,3,3-tetramethylbutyl)amino]-S-tribromo-2,4-diyl}.

Also provided is a preparation method of the low-yellowness-index high-visible-light-transmittance anti-blue light resin lens with a refractive index of 1.50, including the following steps:

(1) Blending: A resin monomer, anti-blue light powder, an initiator, an antioxidant and a light stabilizer are proportionally weighed, and stirred at room temperature for 2-2.5 hours to obtain a uniform mixture, and a vacuum of −0.1 MPa is created for 30-60 min, thereby completing the blending.

(2) Pouring: The uniform mixture in step (1) is poured into a glass mold through a 1 μm filter, and the glass mold is sealed with an adhesive tape.

(3) First thermal curing: An initial temperature is set at 20-25° C., and the temperature is raised to 30-35° C. within 1 h, raised to 35-40° C. within 1 h, kept for 4 h, raised to 50-55° C. within 8 h, kept for 4 h, raised to 90-95° C. within 2.0 h, kept for 2 h, and lowered to 60-70° C. within 1 h. After the completion of the first thermal curing, mold unloading, edge rounding and cleaning may be performed.

(4) Second thermal curing: Second thermal curing is performed at a temperature of 110° C. for 2 h.

(5) After the completion of the curing, a hard coating may be applied.

Compared with the prior art, the disclosure has the following beneficial effects.

With the raw materials according to the specific ratio, the anti-blue light resin lens with a refractive index of 1.50 provided in the disclosure has a higher blue light absorptivity, a low yellowness index, a high visible light transmittance and good impact resistance.

According to the disclosure, the specific proportion of the specific monomer is used in combination with the suitable anti-blue light powder. The monofunctional acrylate increases the Abbe number of the lens, reduces the refractive index of the lens, and increases the hardness and impact resistance of the lens, and the polyfunctional acrylate reduces the yellowness index and increases the visible light transmittance.

DETAILED DESCRIPTION

The following describes the exemplary implementations of the disclosure in detail with reference to the accompanying drawings and specific embodiments.

Embodiment 1

This embodiment used the following raw materials and chemicals:

Monofunctional acrylate: ethyl methacrylate (Hannong, Korea)

Bifunctional acrylate: 1,6-hexanediol diacrylate (Hannong, Korea)

Tetrafunctional acrylate: dipentaerythritoltetraacrylate (Hannong, Korea)

Anti-blue light powder: 2-(5-tert-butyl-2-hydroxyphenyl) benzotriazole (Nanjing Jingtianwei Chemical Co., Ltd)

Initiator: azobisisobutyronitrile (Jinan Weizhen Chemical Co., Ltd)

Antioxidant: pentaerythritol tetrakis[β-(3,5-di-tert-butyl-4-hydroxyphenyl)propionate] (Shanghai Huan'ang Material Co., Ltd)

Light stabilizer: bis(2,2,6,6-tetramethyl-4-piperidinyl) sebacate (Shanghai Huan'ang Material Co., Ltd)

An anti-blue light resin lens with a refractive index of 1.50 included 10 kg of resin monomer (1 kg of monofunctional acrylate, 4 kg of bifunctional acrylate and 5 kg of tetrafunctional acrylate), 10 g of anti-blue light powder, 10 g of initiator, 10 g of antioxidant and 10 g of light stabilizer.

A preparation method of the lens included the following steps:

(1) Blending: A resin monomer, anti-blue light powder, an initiator, an antioxidant and a light stabilizer were proportionally weighed, and stirred at room temperature for 2-2.5 hours to obtain a uniform mixture, and a vacuum of −0.1 MPa was created for 30-60 min, thereby completing the blending.

(2) Pouring: The uniform mixture in step (1) was poured into a glass mold through a 1 μm filter, and the glass mold was sealed with an adhesive tape.

(3) First thermal curing: An initial temperature was set at 20-25° C., and the temperature was raised to 30-35° C. within 1 h, raised to 35-40° C. within 1 h, kept for 4 h, raised to 50-55° C. within 8 h, kept for 4 h, raised to 90-95° C. within 2.0 h, kept for 2 h, and lowered to 60-70° C. within 1 h.

(4) Mold unloading, edge rounding and cleaning were performed.

(5) Second thermal curing: Second thermal curing was performed at a temperature of 110° C. for 2 h.

(6) A hard coating was applied.

Embodiment 2

This embodiment used the following raw materials and chemicals:

Monofunctional acrylate: propyl methacrylate (Shanghai Linqi New Material Co., Ltd)

Bifunctional acrylate: dipropylene glycol diacrylate (Eternal, Taiwan)

Trifunctional acrylate: trimethylolpropane trimethacrylate (Eternal, Taiwan)

Anti-blue light powder: 2-[2-hydroxy-3,5-di(1,1-dimethylpropylphenyl)]-2H-benzotriazole (Nanjing Jingtianwei Chemical Co., Ltd)

Initiator: azobisisoheptonitrile (Jinan Weizhen Chemical Co., Ltd)

Antioxidant: n-octadecyl β-(3,5-di-tert-butyl-4-hydroxyphenyl)propionate (Shanghai Huan'ang Material Co., Ltd)

Light stabilizer: bis(2,2,6,6-tetramethyl-4-piperidinyl) sebacate (Shanghai Huan'ang Material Co., Ltd)

An anti-blue light resin lens with a refractive index of 1.50 included 10 kg of resin monomer (5 kg of monofunctional acrylate, 2 kg of bifunctional acrylate and 3 kg of trifunctional acrylate), 100 g of anti-blue light powder, 100 g of initiator, 100 g of antioxidant and 100 g of light stabilizer.

A preparation method of the lens included the following steps:

(1) Blending: A resin monomer, anti-blue light powder, an initiator, an antioxidant and a light stabilizer were proportionally weighed, and stirred at room temperature for 2-2.5 hours to obtain a uniform mixture, and a vacuum of −0.1 MPa was created for 30-60 min, thereby completing the blending.

(2) Pouring: The uniform mixture in step (1) was poured into a glass mold through a 1 μm filter, and the glass mold was sealed with an adhesive tape.

(3) First thermal curing: An initial temperature was set at 20-25° C., and the temperature was raised to 30-35° C. within 1 h, raised to 35-40° C. within 1 h, kept for 4 h, raised to 50-55° C. within 8 h, kept for 4 h, raised to 90-95° C. within 2.0 h, kept for 2 h, and lowered to 60-70° C. within 1 h.

(4) Mold unloading, edge rounding and cleaning were performed.

(5) Second thermal curing: Second thermal curing was performed at a temperature of 110° C. for 2 h.

(6) A hard coating was applied.

Embodiment 3

This embodiment used the following raw materials and chemicals:
- Monofunctional acrylate: isodecyl acrylate (Nantong Reform Chemical Co., Ltd)
- Trifunctional acrylate: glycerol trimethacrylate (Hannong, Korea)
- Tetrafunctional acrylate: pentaerythritol tetraacrylate (Hannong, Korea)
- Anti-blue light powder: 2-[4-[2-hydroxy-3-tridecyloxy-propyl]oxy]-2-hydroxyphenyl]-4,6-bis(2,4-dimethylphenyl)-1,3,5-triazine (Wuxi Unichem Company Ltd.)
- Initiator: azobisisobutyronitrile (Jinan Weizhen Chemical Co., Ltd)
- Antioxidant: 1,3,5-tris(3,5-di-tert-butyl-4-hydroxybenzyl)isocyanuric acid (Jiangxi Lotchem Co., Ltd)
- Light stabilizer: bis(2,2,6,6-tetramethyl-4-piperidinyl) sebacate (Jiangxi Lotchem Co., Ltd)

An anti-blue light resin lens with a refractive index of 1.50 included 10 kg of resin monomer (2 kg of monofunctional acrylate, 4 kg of trifunctional acrylate and 4 kg of tetrafunctional acrylate), 50 g of anti-blue light powder, 20 g of initiator, 20 g of antioxidant and 20 g of light stabilizer.

A preparation method of the lens included the following steps:
(1) Blending: A resin monomer, anti-blue light powder, an initiator, an antioxidant and a light stabilizer were proportionally weighed, and stirred at room temperature for 2-2.5 hours to obtain a uniform mixture, and a vacuum of −0.1 MPa was created for 30-60 min, thereby completing the blending.
(2) Pouring: The uniform mixture in step (1) was poured into a glass mold through a 1 μm filter, and the glass mold was sealed with an adhesive tape.
(3) First thermal curing: An initial temperature was set at 20-25° C., and the temperature was raised to 30-35° C. within 1 h, raised to 35-40° C. within 1 h, kept for 4 h, raised to 50-55° C. within 8 h, kept for 4 h, raised to 90-95° C. within 2.0 h, kept for 2 h, and lowered to 60-70° C. within 1 h.
(4) Mold unloading, edge rounding and cleaning were performed.
(5) Second thermal curing: Second thermal curing was performed at a temperature of 110° C. for 2 h.
(6) A hard coating was applied.

Embodiment 4

This embodiment used the following raw materials and chemicals:
- Monofunctional acrylate: methyl methacrylate (Nantong Reform Chemical Co., Ltd)
- Bifunctional acrylate: polyethylene glycol dimethacrylate (Eternal, Taiwan)
- Trifunctional acrylate: trimethylolpropane trimethacrylate (Eternal, Taiwan)
- Tetrafunctional acrylate: di(trimethylolpropane) tetraacrylate (Eternal, Taiwan)
- Anti-blue light powder: 2-[4-[2-hydroxy-3-dodecyloxy-propyl]oxy]-2-hydroxyphenyl]-4,6-bis(2,4-dimethylphenyl)-1,3,5-triazine (Wuxi Unichem Company Ltd.)
- Initiator: azobisisoheptonitrile (Jinan Weizhen Chemical Co., Ltd)
- Antioxidant: 1,3,5-tris(3,5-di-tert-butyl-4-hydroxybenzyl)isocyanuric acid (Jiangxi Lotchem Co., Ltd)
- Light stabilizer: poly{[(6-1,1,3,3-tetramethylbutyl)amino]-S-tribromo-2,4-diyl} (Jiangxi Lotchem Co., Ltd)

An anti-blue light resin lens with a refractive index of 1.50 included 10 kg of resin monomer (4 kg of monofunctional acrylate, 2 kg of bifunctional acrylate, 2 kg of trifunctional acrylate and 2 kg of tetrafunctional acrylate), 500 g of anti-blue light powder, 80 g of initiator, 50 g of antioxidant and 50 g of light stabilizer.

A preparation method of the lens included the following steps:
(1) Blending: A resin monomer, anti-blue light powder, an initiator, an antioxidant and a light stabilizer were proportionally weighed, and stirred at room temperature for 2-2.5 hours to obtain a uniform mixture, and a vacuum of −0.1 MPa was created for 30-60 min, thereby completing the blending.
(2) Pouring: The uniform mixture in step (1) was poured into a glass mold through a 1 μm filter, and the glass mold was sealed with an adhesive tape.
(3) First thermal curing: An initial temperature was set at 20-25° C., and the temperature was raised to 30-35° C. within 1 h, raised to 35-40° C. within 1 h, kept for 4 h, raised to 50-55° C. within 8 h, kept for 4 h, raised to 90-95° C. within 2.0 h, kept for 2 h, and lowered to 60-70° C. within 1 h.
(4) Mold unloading, edge rounding and cleaning were performed.
(5) Second thermal curing: Second thermal curing was performed at a temperature of 110° C. for 2 h.
(6) A hard coating was applied.

Comparative Example 1

An anti-blue light resin lens included 10 kg of resin monomer (1 kg of allyl methyl carbonate, 4 kg of bifunctional acrylate and 5 kg of tetrafunctional acrylate), 10 g of anti-blue light powder, 10 g of initiator, 10 g of antioxidant and 10 g of light stabilizer. The types of raw materials and the preparation method were the same as in Embodiment 1.

Comparative Example 2

An anti-blue light resin lens included 10 kg of resin monomer (5 kg of bifunctional acrylate and 5 kg of tetrafunctional acrylate), 10 g of anti-blue light powder, 10 g of initiator, 10 g of antioxidant and 10 g of light stabilizer. The types of raw materials and the preparation method were the same as in Embodiment 1.

Comparative Example 3

An anti-blue light resin lens included 10 kg of resin monomer (10 kg of ethyl methacrylate), 10 g of anti-blue light powder, 10 g of initiator, 10 g of antioxidant and 10 g of light stabilizer. The types of raw materials and the preparation method were the same as in Embodiment 1.

Comparative Example 4

An anti-blue light resin lens with a refractive index of 1.50 included 10 kg of resin monomer (2 kg of allyl methyl carbonate, 4 kg of trifunctional acrylate and 4 kg of tetrafunctional acrylate), 50 g of anti-blue light powder (benzophenone), 20 g of initiator, 20 g of antioxidant and 20 g of light stabilizer. The types of other raw materials and the preparation method were the same as in Embodiment 3.

The performance comparison of the lenses in the embodiments and comparative examples above is shown in Table 1.

TABLE 1

Performance comparison of lenses in embodiments and comparative examples

| Sample | Refractive index $n_d$ | Abbe number | Visible light transmittance | Blue light absorptivity (380 to 500 nm) | Impact resistance | Yellowness index | Acceptability |
|---|---|---|---|---|---|---|---|
| Embodiment 1 | 1.504 | 52.5 | 93.6% | 28.2% | Pass | 10.9 | 92.3% |
| Embodiment 2 | 1.502 | 54.6 | 92.4% | 33.6% | Pass | 11.7 | 93.5% |
| Embodiment 3 | 1.503 | 53.1 | 92.8% | 32.2% | Pass | 11.1 | 92.7% |
| Embodiment 4 | 1.503 | 53.9 | 92.9% | 32.1% | Pass | 11.1 | 93.6% |
| Comparative Example 1 | 1.501 | 44.2 | 91.6% | 28.1% | Not Pass | 13.4 | 50.3% |
| Comparative Example 2 | 1.507 | 52.3 | 91.7% | 28.0% | Not Pass | 10.8 | 89.5% |
| Comparative Example 3 | — | — | — | — | — | — | 0, imploded |
| Comparative Example 4 | 1.506 | 42.5 | 89.8% | 25.3% | Not Pass | 15.6 | 61.8% |

NOTE:
The refractive index and the Abbe number were tested by an Abbe refractometer, the visible light transmittance was tested by a TM-3 spectrometer, the impact resistance was tested by an impact resistance test mandated by FDA, and the yellowness index was tested by a colorimeter.

As can be seen from the comparison above, the lenses only prepared from the acrylate monomers had significantly lower yellowness index than that of the lenses prepared from the carbonate monomer and the acrylate monomers, the lens only prepared from the monofunctional acrylate monomer was prone to implosion, and the lens only prepared from the polyfunctional acrylate monomers had insufficient impact resistance. The lenses of the disclosure all had a blue light (having a wavelength ranging from 380 to 500 nm) absorptivity of higher than 28%, even up to 33% or above, and also had a low yellowness index, a high visible light transmittance, good impact resistance and a high acceptability.

The embodiments of the disclosure are described above, and the foregoing descriptions are exemplary but not exhaustive and are not limited to the disclosed embodiments. Without departing from the scope and technical principle of the described embodiments, many modifications and variations are apparent to a person of ordinary skill in the technical field, and the modifications and variations shall fall within the protection scope of the disclosure.

What is claimed is:

1. An anti-blue light resin lens with a refractive index of 1.50, comprising the following components: 100 parts by weight of resin monomer, 0.1-10 parts by weight of anti-blue light powder, 0.1-1 part by weight of initiator, 0.1-1 part by weight of antioxidant and 0.1-1 part by weight of light stabilizer; wherein the resin monomer is a mixture of a monofunctional acrylate and a polyfunctional acrylate, and a mass ratio of the monofunctional acrylate to the polyfunctional acrylate in the mixture is (10-50):(50-90).

2. The anti-blue light resin lens with a refractive index of 1.50 according to claim 1, wherein the lens comprises the following components: 100 parts by weight of resin monomer, 0.5-5 parts by weight of anti-blue light powder, 0.2-0.8 part by weight of initiator, 0.2-0.5 part by weight of antioxidant and 0.2-0.5 part by weight of light stabilizer; wherein the resin monomer is the mixture of the monofunctional acrylate and the polyfunctional acrylate, and the mass ratio of the monofunctional acrylate to the polyfunctional acrylate in the mixture is (20-40):(60-80).

3. The anti-blue light resin lens with a refractive index of 1.50 according to claim 2, wherein the lens has a refractive index $n_e$ of 1.505±0.003, an Abbe number of 55±5%, a yellowness index of lower than 12 and a visible light transmittance of higher than 90%.

4. The anti-blue light resin lens with a refractive index of 1.50 according to claim 2, wherein the monofunctional acrylate is one or more of methyl methacrylate, ethyl methacrylate, propyl methacrylate, methyl laurate, isodecyl acrylate and isooctyl acrylate.

5. The anti-blue light resin lens with a refractive index of 1.50 according to claim 2, wherein the polyfunctional acrylate is two or more of polyethylene glycol dimethacrylate, dipropylene glycol diacrylate, 1,6-hexanediol diacrylate, trimethylolpropane trimethacrylate, glycerol trimethacrylate, pentaerythritol tetraacrylate, di(trimethylolpropane) tetraacrylate and dipentaerythritoltetraacrylate.

6. The anti-blue light resin lens with a refractive index of 1.50 according to claim 2, wherein the anti-blue light powder is one or two of benzotriazole and triazine; the benzotriazole is one of 2-(5-tert-butyl-2-hydroxyphenyl) benzotriazole, 2-(2'-hydroxy-5'-tert-octylphenyl)benzotriazole, 2'-(2'-hydroxy-3'-tert-butyl-5'-methylphenyl)-5-chlorobenzotriazole, 2-[2-hydroxy-3,5-di(1,1-dimethylpropylphenyl)]-2H-benzotriazole, 2-(2"-hydroxy-3",5"-di-tert-butylphenyl)-5-chlorobenzotriazole, 2-(3,5-di-tert-butyl-2-hydroxyphenyl)-2H-benzotriazole or 2-(2'-hydroxy-3'-isobutyl-5'-tert-butylphenyl)benzotriazole; and the triazine is 2-[4-[2-hydroxy-3-tridecyloxypropyl]oxy]-2-hydroxyphenyl]-4,6-bis(2,4-dimethylphenyl)-1,3,5-triazine, 2-[4-[2-hydroxy-3-dodecyloxypropyl]oxy]-2-hydroxyphenyl]-4,6-bis(2,4-dimethylphenyl)-1,3,5-triazine or 2-[2-hydroxy-4-[3-(2-ethylhexyloxy)-2-hydroxypropoxy]phenyl]-4,6-bis(2,4-dimethylphenyl)-1,3,5-triazine.

7. The low-yellowness-index high-visible-light-transmittance anti-blue light resin lens with a refractive index of 1.50 according to claim 2, wherein the initiator is an azo initiator, preferably azobisisobutyronitrile or azobisisoheptonitrile.

8. The low-yellowness-index high-visible-light-transmittance anti-blue light resin lens with a refractive index of 1.50 according to claim 2, wherein the antioxidant is one or more of pentaerythritol tetrakis[β-(3,5-di-tert-butyl-4-hydroxyphenyl)propionate], n-octadecyl β-(3,5-di-tert-butyl-4-hydroxyphenyl)propionate, isooctyl β-(3,5-di-tert-butyl-4-hydroxyphenyl)propionate and 1,3,5-tris(3,5-di-tert-butyl-4-hydroxybenzyl)isocyanuric acid; and the light stabilizer is one or more of bis(2,2,6,6-tetramethyl-4-piperidinyl) sebacate and poly{[(6-1,1,3,3-tetramethylbutyl)amino]-S-tribromo-2,4-diyl}.

9. The low-yellowness-index high-visible-light-transmittance anti-blue light resin lens with a refractive index of 1.50 according to claim 2, characterized in that said resin lens is prepared by:
(1) blending: proportionally weighing a resin monomer, anti-blue light powder, an initiator, an antioxidant and a light stabilizer, stirring the components at room temperature for 2-2.5 hours to obtain a uniform mixture, and creating a vacuum of −0.1 MPa for 30-60 min, thereby completing the blending;
(2) pouring: pouring the uniform mixture in step (1) into a glass mold through a 1 μm filter, and sealing the glass mold with an adhesive tape;
(3) first thermal curing: setting an initial temperature at 20-25° C., raising the temperature to 30-35° C. within 1 h, raising the temperature to 35-40° C. within 1 h, keeping the temperature for 4 h, raising the temperature to 50-55° C. within 8 h, keeping the temperature for 4 h, raising the temperature to 90-95° C. within 2.0 h, keeping the temperature for 2 h, and lowering the temperature to 60-70° C. within 1 h; and
(4) second thermal curing: performing second thermal curing at a temperature of 110° C. for 2 h.

10. A preparation method of the low-yellowness-index high-visible-light-transmittance anti-blue light resin lens with a refractive index of 1.50 according to claim 2, comprising the following steps:
(1) blending: proportionally weighing a resin monomer, anti-blue light powder, an initiator, an antioxidant and a light stabilizer, stirring the components at room temperature for 2-2.5 hours to obtain a uniform mixture, and creating a vacuum of −0.1 MPa for 30-60 min, thereby completing the blending;
(2) pouring: pouring the uniform mixture in step (1) into a glass mold through a 1 μm filter, and sealing the glass mold with an adhesive tape;
(3) first thermal curing: setting an initial temperature at 20-25° C., raising the temperature to 30-35° C. within 1 h, raising the temperature to 35-40° C. within 1 h, keeping the temperature for 4 h, raising the temperature to 50-55° C. within 8 h, keeping the temperature for 4 h, raising the temperature to 90-95° C. within 2.0 h, keeping the temperature for 2 h, and lowering the temperature to 60-70° C. within 1 h; and
(4) second thermal curing: performing second thermal curing at a temperature of 110° C. for 2 h.

11. The anti-blue light resin lens with a refractive index of 1.50 according to claim 1, wherein the lens has a refractive index $n_e$ of 1.505±0.003, an Abbe number of 55±5%, a yellowness index of lower than 12 and a visible light transmittance of higher than 90%.

12. The anti-blue light resin lens with a refractive index of 1.50 according to claim 1, wherein the monofunctional acrylate is one or more of methyl methacrylate, ethyl methacrylate, propyl methacrylate, methyl laurate, isodecyl acrylate and isooctyl acrylate.

13. The anti-blue light resin lens with a refractive index of 1.50 according to claim 1, wherein the polyfunctional acrylate is two or more of polyethylene glycol dimethacrylate, dipropylene glycol diacrylate, 1,6-hexanediol diacrylate, trimethylolpropane trimethacrylate, glycerol trimethacrylate, pentaerythritol tetraacrylate, di(trimethylolpropane) tetraacrylate and dipentaerythritoltetraacrylate.

14. The anti-blue light resin lens with a refractive index of 1.50 according to claim 1, wherein the anti-blue light powder is one or two of benzotriazole and triazine; the benzotriazole is one of 2-(5-tert-butyl-2-hydroxyphenyl) benzotriazole, 2-(2'-hydroxy-5'-tert-octylphenyl)benzotriazole, 2'-(2'-hydroxy-3'-tert-butyl-5'-methylphenyl)-5-chlorobenzotriazole, 2-[2-hydroxy-3,5-di(1,1-dimethylpropylphenyl)]-2H-benzotriazole, 2-(2"-hydroxy-3",5"-di-tert-butylphenyl)-5-chlorobenzotriazole, 2-(3,5-di-tert-butyl-2-hydroxyphenyl)-2H-benzotriazole or 2-(2'-hydroxy-3'-isobutyl-5'-tert-butylphenyl)benzotriazole; and the triazine is 2-[4-[2-hydroxy-3-tridecyloxypropyl]oxy]-2-hydroxyphenyl]-4,6-bis(2,4-dimethylphenyl)-1,3,5-triazine, 2-[4-[2-hydroxy-3-dodecyloxypropyl]oxy]-2-hydroxyphenyl]-4,6-bis(2,4-dimethylphenyl)-1,3,5-triazine or 2-[2-hydroxy-4-[3-(2-ethylhexyloxy)-2-hydroxypropoxy]phenyl]-4,6-bis(2,4-dimethylphenyl)-1,3,5-triazine.

15. The low-yellowness-index high-visible-light-transmittance anti-blue light resin lens with a refractive index of 1.50 according to claim 1, wherein the initiator is an azo initiator, preferably azobisisobutyronitrile or azobisisoheptonitrile.

16. The low-yellowness-index high-visible-light-transmittance anti-blue light resin lens with a refractive index of 1.50 according to claim 1, wherein the antioxidant is one or more of pentaerythritol tetrakis[β-(3,5-di-tert-butyl-4-hydroxyphenyl)propionate], n-octadecyl β-(3,5-di-tert-butyl-4-hydroxyphenyl)propionate, isooctyl β-(3,5-di-tert-butyl-4-hydroxyphenyl)propionate and 1,3,5-tris(3,5-di-tert-butyl-4-hydroxybenzyl)isocyanuric acid; and the light stabilizer is one or more of bis(2,2,6,6-tetramethyl-4-piperidinyl) sebacate and poly{[(6-1,1,3,3-tetramethylbutyl)amino]-S-tribromo-2,4-diyl}.

17. The low-yellowness-index high-visible-light-transmittance anti-blue light resin lens with a refractive index of 1.50 according to claim 1, characterized in that said resin lens is prepared by:
(1) blending: proportionally weighing a resin monomer, anti-blue light powder, an initiator, an antioxidant and a light stabilizer, stirring the components at room temperature for 2-2.5 hours to obtain a uniform mixture, and creating a vacuum of −0.1 MPa for 30-60 min, thereby completing the blending;
(2) pouring: pouring the uniform mixture in step (1) into a glass mold through a 1 μm filter, and sealing the glass mold with an adhesive tape;
(3) first thermal curing: setting an initial temperature at 20-25° C., raising the temperature to 30-35° C. within 1 h, raising the temperature to 35-40° C. within 1 h, keeping the temperature for 4 h, raising the temperature to 50-55° C. within 8 h, keeping the temperature for 4 h, raising the temperature to 90-95° C. within 2.0 h, keeping the temperature for 2 h, and lowering the temperature to 60-70° C. within 1 h; and
(4) second thermal curing: performing second thermal curing at a temperature of 110° C. for 2 h.

18. A preparation method of the low-yellowness-index high-visible-light-transmittance anti-blue light resin lens with a refractive index of 1.50 according to claim 1, comprising the following steps:
(1) blending: proportionally weighing a resin monomer, anti-blue light powder, an initiator, an antioxidant and a light stabilizer, stirring the components at room temperature for 2-2.5 hours to obtain a uniform mixture, and creating a vacuum of −0.1 MPa for 30-60 min, thereby completing the blending;

(2) pouring: pouring the uniform mixture in step (1) into a glass mold through a 1 μm filter, and sealing the glass mold with an adhesive tape;

(3) first thermal curing: setting an initial temperature at 20-25° C., raising the temperature to 30-35° C. within 1 h, raising the temperature to 35-40° C. within 1 h, keeping the temperature for 4 h, raising the temperature to 50-55° C. within 8 h, keeping the temperature for 4 h, raising the temperature to 90-95° C. within 2.0 h, keeping the temperature for 2 h, and lowering the temperature to 60-70° C. within 1 h; and (4) second thermal curing: performing second thermal curing at a temperature of 110° C. for 2 h.

\* \* \* \* \*